United States Patent
Oh et al.

(10) Patent No.: US 11,824,574 B2
(45) Date of Patent: Nov. 21, 2023

(54) SMART MAX POWER CONTROL TO MITIGATE EXCESSIVE RADIATED POWER

(71) Applicant: GM GLOBAL TECHNOLOGY OPERATIONS LLC, Detroit, MI (US)

(72) Inventors: Jang Hwan Oh, Troy, MI (US); George Knish, Rochester Hills, MI (US); Aziz U. Noori, Rochester Hills, MI (US); Michael Lawrence Mandziuk, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 332 days.

(21) Appl. No.: 17/105,222

(22) Filed: Nov. 25, 2020

(65) Prior Publication Data
US 2022/0166452 A1 May 26, 2022

(51) Int. Cl.
*H04B 1/16* (2006.01)
*H04W 4/40* (2018.01)
*H04W 52/00* (2009.01)

(52) U.S. Cl.
CPC .......... *H04B 1/1607* (2013.01); *H04W 4/40* (2018.02); *H04W 52/00* (2013.01)

(58) Field of Classification Search
None
See application file for complete search history.

(56) References Cited

U.S. PATENT DOCUMENTS

2022/0135039 A1* 5/2022 Jardine .......... B60W 30/18159
701/26

* cited by examiner

*Primary Examiner* — Willie J Daniel, Jr.
(74) *Attorney, Agent, or Firm* — Lorenz & Kopf LLP

(57) ABSTRACT

In an exemplary embodiment, a vehicle is provided that includes an antenna and a telematics system. The telematics system is configured to be coupled to the antenna, and includes a processor that is configured to at least facilitate: determining whether power to an antenna of the vehicle would result in radiated power emissions that would exceed a regulatory requirement; and reducing power to the antenna when it is determined that the power to the antenna would result in radiated power emissions that would exceed the regulatory requirement.

20 Claims, 2 Drawing Sheets

SMART MAX POWER CONTROL TO MITIGATE EXCESSIVE RADIATED POWER

TECHNICAL FIELD

The technical field generally relates to vehicles, and more particularly relates to methods and systems for mitigating excessive radiated power.

Certain vehicles today have telematics units that provide cellular communications as well as other features for the vehicles. However, this may result in excessive radiated power that could exceed regulatory limits in certain jurisdictions.

Accordingly, it may be desirable to provide improved methods and systems for controlling radiated power, for example in vehicles. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary a method is provided that includes: determining, via a processor of a telematics unit of a vehicle, whether power to an antenna of the vehicle would result in radiated power emissions that would exceed a regulatory requirement; and reducing power to the antenna, via instructions provided by the processor, when it is determined that the power to the antenna would result in radiated power emissions that would exceed the regulatory requirement.

Also in an exemplary embodiment, the method further includes; obtaining sensor data from one or more sensors as to whether an antenna is connected to a telematics unit of a vehicle; wherein the reducing of power to the antenna is performed only upon a further condition that the antenna is connected to the telematics unit.

Also in an exemplary embodiment, the method further includes: determining, via location sensor data obtained via a satellite-based location network, a geographic location in which the vehicle is being operated; wherein the step of determining whether power to the antenna would result in radiated power emissions that would exceed a regulatory requirement is based on regulatory requirements of a particular jurisdiction corresponding to the geographic location; and wherein the step of reducing power to the antenna is performed when it is determined that the power to the antenna would result in radiated power emissions that would exceed the regulatory requirements of the particular jurisdiction.

Also in an exemplary embodiment, the step of reducing power to the antenna includes: reducing a maximum power limit to the antenna for a radio frequency or radio access technology (RAT) at which the telematics system is operating, when it is determined that the power to the antenna would result in radiated power emissions that would exceed the regulatory requirement.

Also in an exemplary embodiment, the step of reducing power to the antenna includes: reducing the maximum power limit to the antenna only for the radio frequency or RAT at which the telematics system is operating, and not for other radio frequencies/RATs, when it is determined that the power to the antenna would result in radiated power emissions that would exceed the regulatory requirement.

Also in an exemplary embodiment, the maximum power limit to the antenna is reduced by a magnitude that is determined based on a table stored in a non-transitory computer memory as to power reductions required for a particular type of the vehicle for a plurality of different combinations of radio frequencies in which the telematics unit may be operating and jurisdictions in which the vehicle may travel.

Also in an exemplary embodiment, the table is generated based on testing in a laboratory using one or more vehicles of a same type as the vehicle with respective telematics units operating at a plurality of different radio frequencies/RATs, with antenna gain for the antenna measured at each of the plurality of frequencies/RATs.

In another exemplary embodiment, a system is provided that includes a non-transitory computer readable storage medium and a computer program. The non-transitory computer readable storage medium stores a computer program configured to at least facilitate: determining, via a processor of a telematics unit of a vehicle, whether power to an antenna of the vehicle would result in radiated power emissions that would exceed a regulatory requirement; and reducing power to the antenna, via instructions provided by the processor, when it is determined that the power to the antenna would result in radiated power emissions that would exceed the regulatory requirement. The processor is coupled to the non-transitory computer readable storage medium, and is configured to execute the program.

In another exemplary embodiment, the program is further configured to at least facilitate obtaining sensor data from one or more sensors as to whether an antenna is connected to a telematics unit of a vehicle; and performing the reducing of power to the antenna only upon a further condition that the antenna is connected to the telematics unit.

In another exemplary embodiment, the program is further configured to at least facilitate determining, via location sensor data obtained via a satellite-based location network, a geographic location in which the vehicle is being operated; determining whether power to the antenna would result in radiated power emissions that would exceed a regulatory requirement based on regulatory requirements of a particular jurisdiction corresponding to the geographic location; and reducing power to the antenna when it is determined that the power to the antenna would result in radiated power emissions that would exceed the regulatory requirements of the particular jurisdiction.

In another exemplary embodiment, the program is further configured to at least facilitate reducing a maximum power limit to the antenna for a radio frequency or radio access technology (RAT) at which the telematics system is operating, when it is determined that the power to the antenna would result in radiated power emissions that would exceed the regulatory requirement.

In another exemplary embodiment, the program is further configured to at least facilitate reducing the maximum power limit to the antenna by a magnitude that is determined based on a table stored in a non-transitory computer memory as to power reductions required for a particular type of the vehicle for a plurality of different combinations of radio frequencies/RATs in which the telematics unit may be operating and jurisdictions in which the vehicle may travel.

In another exemplary embodiment, the program is further configured to at least facilitate generating the table based on testing in a laboratory using one or more vehicles of a same type as the vehicle with respective telematics units operating at a plurality of different radio frequencies/RATs, with antenna gain for the antenna measured at each of the plurality of frequencies/RATs.

In another exemplary embodiment, a vehicle is provided that includes an antenna and a telematics system. The telematics system is configured to be coupled to the antenna, and includes a processor that is configured to at least facilitate: determining whether power to an antenna of the vehicle would result in radiated power emissions that would exceed a regulatory requirement; and reducing power to the antenna when it is determined that the power to the antenna would result in radiated power emissions that would exceed the regulatory requirement.

Also in an exemplary embodiment, the vehicle further includes one or more sensors configured to obtain sensor data as to whether an antenna is connected to a telematics unit of a vehicle; wherein the processor is further configured to at least facilitate performing the reducing of power to the antenna only upon a further condition that the antenna is connected to the telematics unit.

Also in an exemplary embodiment, the vehicle further include a satellite-based navigation component configured to obtain location sensor data as to a geographic location in which the vehicle is being operated; wherein the processor is further configured to at least facilitate: determining whether power to the antenna would result in radiated power emissions that would exceed a regulatory requirement based on regulatory requirements of a particular jurisdiction corresponding to the geographic location; and reducing power to the antenna when it is determined that the power to the antenna would result in radiated power emissions that would exceed the regulatory requirements of the particular jurisdiction.

Also in an exemplary embodiment, the processor is further configured to at least facilitate reducing a maximum power limit to the antenna for a radio frequency or radio access technology (RAT) at which the telematics system is operating, when it is determined that the power to the antenna would result in radiated power emissions that would exceed the regulatory requirement.

Also in an exemplary embodiment, the processor is further configured to at least facilitate reducing a maximum power limit to the antenna only for the radio frequency or RAT at which the telematics system is operating, and not for other radio frequencies, when it is determined that the power to the antenna would result in radiated power emissions that would exceed the regulatory requirement.

Also in an exemplary embodiment, the processor is further configured to at least facilitate reducing the maximum power limit to the antenna by a magnitude that is determined based on a table stored in a non-transitory computer memory as to power reductions required for a particular type of the vehicle for a plurality of different combinations of radio frequencies/RATs in which the telematics unit may be operating and jurisdictions in which the vehicle may travel.

Also in an exemplary embodiment, the processor is further configured to at least facilitate generating the table based on testing in a laboratory using one or more vehicles of a same type as the vehicle with respective telematics units operating at a plurality of different radio frequencies/RATs, with antenna gain for the antenna measured at each of the plurality of frequencies.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
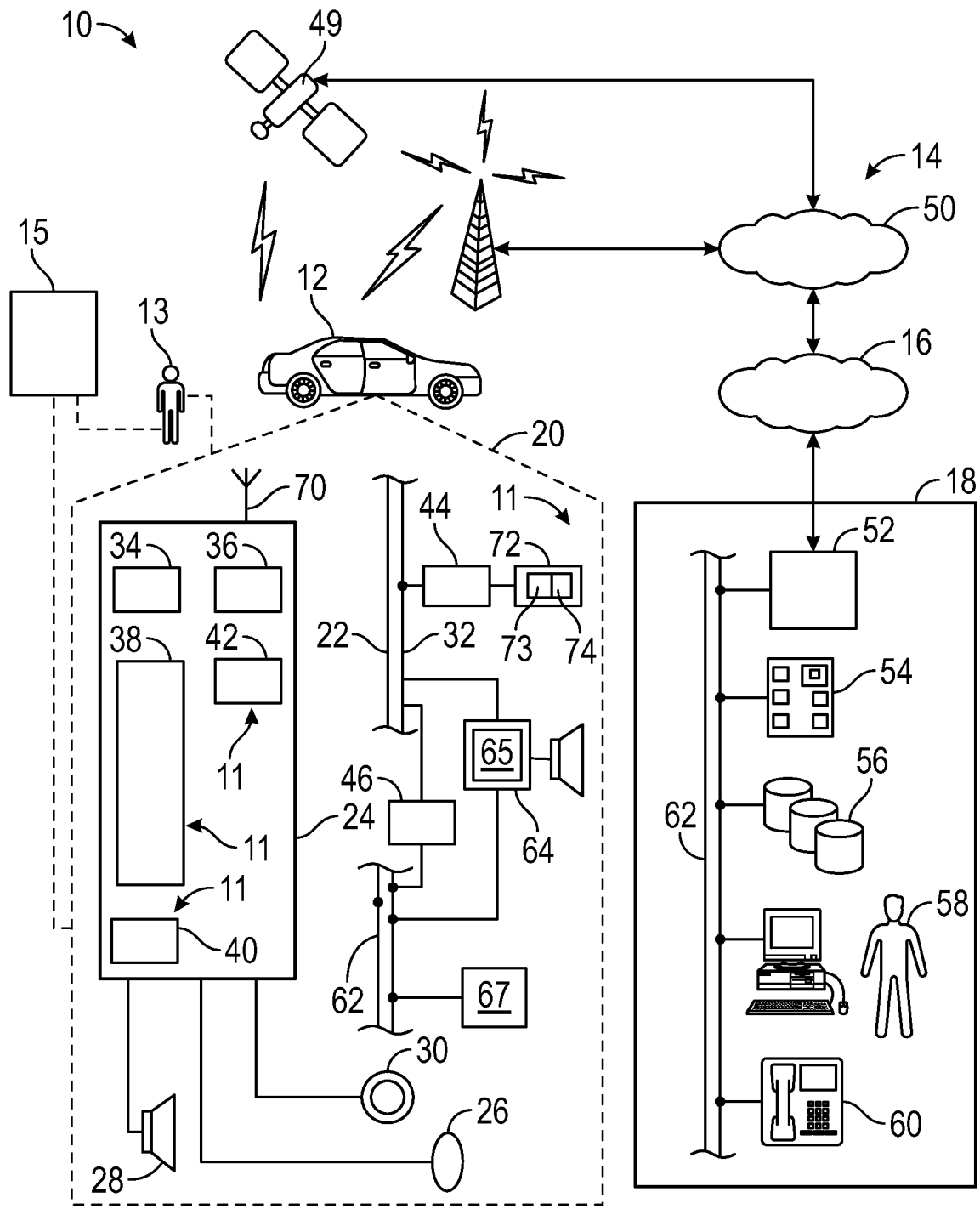
FIG. 1 is a functional block diagram of a communications system that includes a vehicle having a telematics unit and a control system that is configured to regulate radiated power, in accordance with exemplary embodiments.

FIG. 1 is a functional block diagram of a communications system 10, in accordance with an exemplary embodiment. As described in greater detail further below, the communications system 10 includes a vehicle 12 that includes a telematics unit 24 and a control system 11 that is configured to regulate radiated power from the telematics unit 24 to an antenna 70, in a manner that is customized to the specific vehicle 12 and/or type thereof and to meet regulatory requirements of a jurisdiction in which the vehicle 12 is being operated. As described further below in connection with FIG. 1, the control system includes a processor 38, computer memory 40, a satellite-based location determining system component (e.g., GPS) 42, and vehicle sensors 72 that include one or more ignition sensors 73 and antenna sensors 74, described further below.

As depicted in FIG. 1, in certain embodiments, the communications system 10, the communications system 10 also includes and/or is used in connection with an electronic device 15 (e.g., a smart phone, computer, and/or other electronic device) of a user 13 (e.g., a driver or other occupant) of the vehicle 12.

Also as depicted in FIG. 1, the communications system 10 generally includes the vehicle 12, along with one or more wireless carrier systems 14, one or more land networks 16, and one or more remote servers 18. It should be appreciated that the overall architecture, setup and operation, as well as the individual components of the illustrated system are merely exemplary and that differently configured communications systems may also be utilized to implement the examples of the method disclosed herein. Thus, the following paragraphs, which provide a brief overview of the illustrated communications system 10, are not intended to be limiting.

The vehicle 12 may be any type of mobile vehicle such as an automobile, car, motorcycle, truck, recreational vehicle (RV), boat or other watercraft, plane or other aircraft, spacecraft, farm equipment, or the like, and/or any number of other vehicles and/or other types of mobile platforms, and is equipped with suitable hardware and software that enables it to communicate over communications system 10. As shown in FIG. 1, in various embodiments the vehicle hardware 20 is disposed within a body of the vehicle 12, and includes a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media-oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the remote server 18, and generally includes an electronic processing device (processor) 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within electronic processing device 38.

Figure 2:
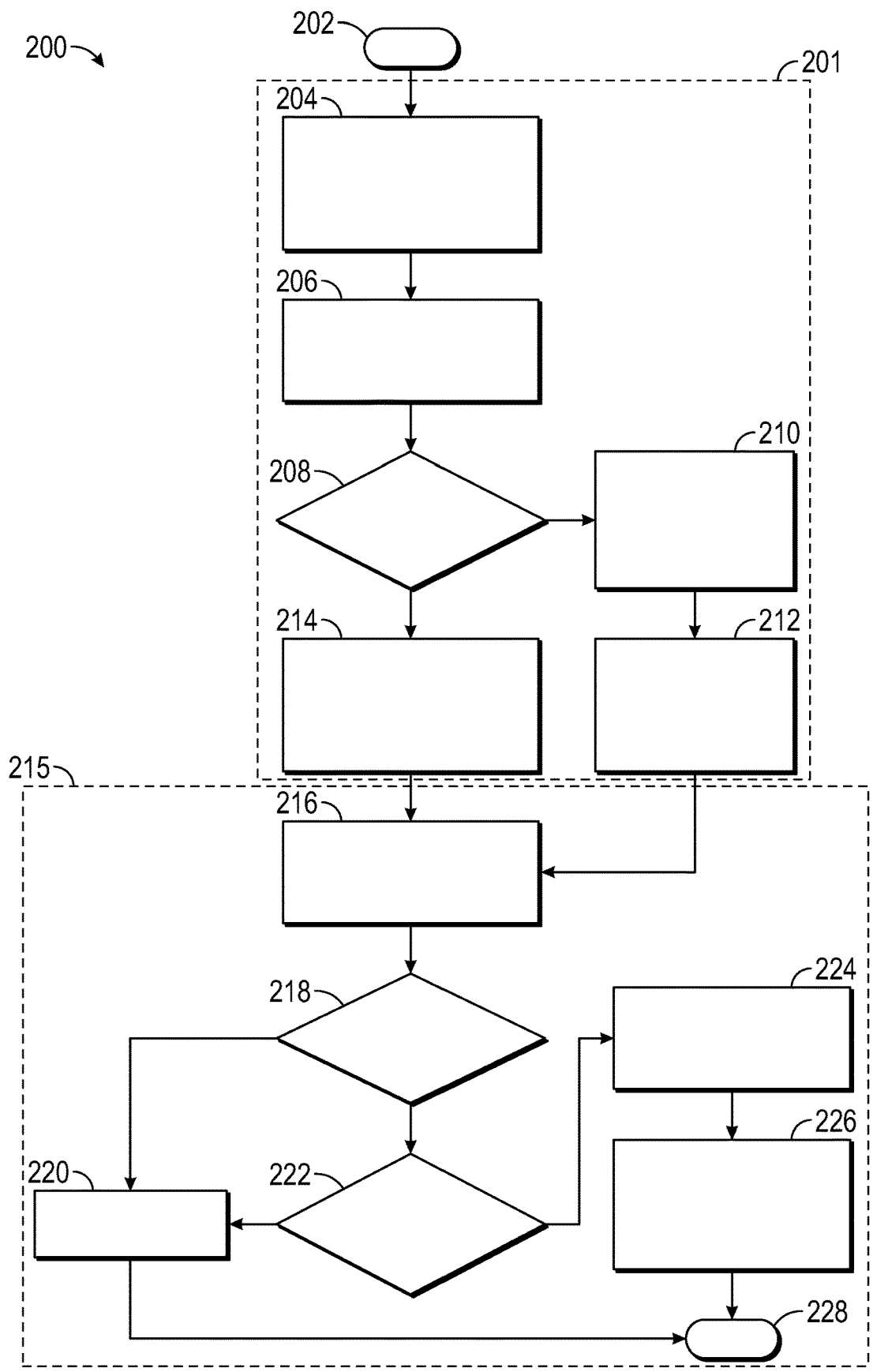
FIG. 2 is a flowchart of a process for regulating radiated power for a telematics unit of communications system, such as in a vehicle, and that can be used in connection with the communications system of FIG. 1, including the vehicle, telematics unit, and control unit thereof, and components thereof, in accordance with exemplary embodiments.

In various embodiments, the processor 38 controls power of specific radio frequency (RF) bands of the telematics unit 24 provided to the antenna 70 in order to meet regulatory components of the jurisdiction in which the vehicle 12 is being operated, using table of reference values that are customized to the specific vehicle 12 and jurisdictions, and that may be stored in the memory 40 of the telematics unit 24 (and/or, in certain embodiments, that may be stored in the database 56 of the server 18, described further below). Also in various embodiments, the processor 38 performs these functions in accordance with the steps of the process 200 that is depicted in FIG. 2 and that is describe further below in connection therewith.

In various embodiments, the telematics unit 24 can be an embedded/installed within the vehicle 12 at the time of manufacture, or may be an aftermarket unit that is installed after manufacture of the vehicle 12. In various embodiments, the telematics unit 24 enables voice and/or data communications over one or more wireless networks (e.g., wireless carrier system 14), and/or via wireless networking, thereby allowing communications with the remote server 18 and/or other vehicles and/or systems.

In various embodiments, the telematics unit 24 may use radio transmissions to establish a voice and/or data channel with the wireless carrier system 14 so that both voice and data transmissions can be sent and received over the voice and/or data channels. Vehicle communications are enabled via the cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), and the like. In one embodiment, dual mode antenna 70 services the GPS chipset/component 42 and the cellular chipset/component 34. In various embodiments, the telematics unit 24 utilizes cellular communication according to industry standards, such as LTE, 5G, or the like. In addition, in various embodiments, the telematics unit 24 carries out wireless networking between the vehicle 12 and one or more other network devices, for example using one or more wireless protocols such as one or more IEEE 802.11 protocols, WiMAX, or Bluetooth.

The telematics unit 24 may offer a number of different services for users of the vehicle 12, including various types of cellular communications, for example via vehicle 12 components and/or the electronic device 15 of the user 13.

In various embodiments, one or more short-range wireless connection (SRWC) protocols (e.g., Bluetooth/Bluetooth Low Energy, or Wi-Fi) may be utilized. In various embodiments, once the SRWC is established, the electronic devices 15 may be become bonded and/or recognized as network participants for the telematics unit 24, for example for current uses as well as in the future. For example, in certain embodiments, when the electronic device 15 is subsequently in wireless range with the telematics unit 24 after the initial pairing, telematics unit 24 (and/or the remote server 18) may confirm that the electronic device 15 is recognized as already being paired or established as a network participant for communicating with the telematics unit 24 and receiving services therefrom.

In addition, in various embodiments, the telematics unit 24 may also provide other services, such as, by way of example: turn-by-turn directions and other navigation-related services provided in conjunction with the GPS chipset/component 42; emergency assistance services, information requests from the users of the vehicle 12 (e.g., regarding points of interest en route while the vehicle 12 is travelling), and/or infotainment-related services, for example in which music, internet web pages, movies, television programs, videogames, and/or other content are downloaded by an infotainment center 46 that may be part of the telematics unit 24 and/or operatively connected to the telematics unit 24 via vehicle bus 32 and audio bus 22, among various other types of possible services.

With respect to other electronic components utilized in connection with the telematics unit 24, the microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and remote server 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with remote server 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22. In various embodiments, the audio component 64 includes radio system 65 (which also includes antenna 70, as well as amplifiers, speakers, and the like, in certain embodiments).

Also in various embodiments, display component 67 provides a visual display for the user 13 of the vehicle 12. In various embodiments, the display components 67 provides a visual display for the user 13 as to relevant information pertaining to the cellular communications, as well as, in various embodiments, navigation information, camera images and video, and so on.

Vehicle sensors 72, connected to various sensor interface modules 44 are operatively connected to the vehicle bus 32.

In various embodiments, the vehicle sensors 72 include both ignition sensors 73 and antenna sensors 74. In various embodiments, one or more ignition sensors 73 detect when an ignition cycle or vehicle drive is beginning or is about to begin. For example, in various embodiments, the ignition sensors 73 detect when the vehicle 12 (e.g., an engine thereof) is starting, and/or when the user 13 has entered the vehicle 12, unlocked the vehicle 12, provided an instruction (e.g., an input device and/or keyfob) to start the vehicle 12, or the like. Also in various embodiments, the antenna sensors 74 detect whether one or more antennas (e.g., antenna 70) are connected to the telematics unit 24.

In addition, in various embodiments, the vehicle sensors 72 may also include any number of additional sensors including, by way of example, gyroscopes, accelerometers, magnetometers, emission detection, and/or control sensors, and the like. Also in various embodiments, exemplary sensor interface modules 44 include powertrain control, climate control, and body control, to name but a few.

In various embodiments, the wireless carrier systems 14 may be any number of cellular telephone systems, satellite-based wireless systems, and/or any other suitable wireless systems, for example that transmits signals between the vehicle hardware 20 and land network 16 (and/or, in certain embodiments, that communicate directly with the vehicle 12 and/or the remote server 18). According to certain examples, wireless carrier system 14 may include and/or be coupled to one or more cell towers 48, satellites 49, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14.

The land network 16 can be a conventional land-based telecommunications network that is connected to one or more landline telephones, and that connects wireless carrier system 14 to remote server 18. For example, the land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

The remote server 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing.

The modem or other telecommunication/computer equipment 60 may include an encoder, as previously explained, and can be connected to various devices such as a server 54 and database 56. For example, the database 56 may store regulatory radiated power requirements for various jurisdictions, as noted above. Moreover, in certain embodiments, the database 56 could also be designed to store other types of data, such as by way of example, subscriber profile records, subscriber behavioral patterns, or any other pertinent subscriber information. Although the illustrated example has been described as it would be used in conjunction with a remote server 18 that is manned, it will be appreciated that the remote server 18 can be any central or remote facility, manned or unmanned, mobile or fixed.

FIG. 2 is a flowchart of a process 200 for regulating radiated power for a telematics unit and antenna of communications system, such as in a vehicle, in accordance with exemplary embodiments. In various embodiments, the process 200 can be utilized in connection with the communications system 10 of FIG. 1, including the vehicle 12, telematics unit 24, antenna 70, and control unit 11 thereof, and components thereof.

In various embodiments, the process 200 includes two subprocesses, namely: (i) a first subprocess 201 during development and/or manufacture of the vehicle 12 (e.g., in a factory), and (ii) a second subprocess 215 during operation of the vehicle 12 (e.g., on a roadway). It will be appreciated that this may vary in other embodiments.

In various embodiments, the process 200 begins at step 202. For example, in various embodiments, the process 200 begins at step 202 when the vehicle 12 (or type thereof, such as an annual model of the particle type of vehicle 12) is being manufactured and/or developed.

In various embodiments, during the first subprocess 201, a matrix of test results is generated for the vehicle at step 204. In various embodiments, the matrix comprises a low power radio frequency device (LPRD) matrix that includes test results for the vehicle being developed and/or manufactured with respect to testing on a functioning antenna of the telematics unit thereof and/or testing on electromagnetic capability (EMC) thereof for each of a plurality of radio frequency (RF) bands and radio access technologies (RATs) for which the antenna telematics unit may be operated. In various embodiments, during step 204, the LPRD matrix is created via testing performed in one or more laboratories. Also in various embodiments, the results of the lab testing allow the LPRD matrix to be created.

Also in various embodiments, during step 206, a utility file for the matrix is read. Specifically, in various embodiments, a processor (such as the processor 38 of FIG. 1) reads a utility file corresponding to the matrix from step 204, which includes maximum transmit conducted radio frequency power level for the antenna 70 for each of the radio frequencies and RATs utilized by the telematics unit 24. In various embodiments, during step 206, the matrix is stored in memory of the telematics module (e.g., computer memory 40 of FIG. 1) and/or database (e.g., database 56 of FIG. 1), for example via the utility file flash.

In various embodiments, during step 208, determinations are made as to whether power reductions are required for any of the radio frequency and RAT combinations. Specifically, in various embodiments, a processor (such as the processor 38 of FIG. 1) determines, for each combination of (a) radio frequency and (b) jurisdiction in which the vehicle may travel, whether a power reduction would be required for such frequency/RAT combination while the vehicle would be operating in that particular jurisdiction. For example, in various embodiments, a power reduction (or back-off) would be required for a specific radio frequency/RAT, vehicle and jurisdiction combination if the radiated power from antenna 70 and telematics unit 24 operation at that particular frequency would otherwise exceed acceptable regulatory limits for the particular jurisdiction (i.e. in the absence of such a power back-off). In various embodiments, as used throughout this Application, the term "jurisdiction" may refer to different countries, groups of countries, states, municipalities, and/or any other type of jurisdiction that might impose differing regulations as to radiated power for vehicles 12 operating in such jurisdictions.

In various embodiments, if it is determined during step 208 that a power reduction is not required for a particular radio frequency/RAT, vehicle and jurisdiction combination, then a maximum power for the particular radio frequency is set equal to its default value and recorded accordingly during step 210. Specifically, in various embodiments, a processor (such as the processor 38 of FIG. 1) sets the default value for the radio frequency equal to a default value at which that the radio frequency typically operates (e.g., for optimal cellular performance and in accordance with cellular industry requirements), and this value is recorded for the radio frequency in a computer memory (e.g., such as the memory 40 and/or the database 56 of FIG. 1).

Also in various embodiments, following step 210, a maximum power back off function is disabled at step 212. Specifically, in various embodiments, during step 212, a processor (such as the processor 38 of FIG. 1) provides that power back-off is not required for this particular radio frequency/RAT, vehicle and jurisdiction combination, and this is recorded in the computer memory.

In various embodiments, following step 212, the first subprocess 201 then terminates, and the process then proceeds to step 216 during the beginning of the second subprocess 216 (e.g., when the vehicle 12 is operated on a roadway), as described in greater detail further below.

With reference back to step 208, in various embodiments, if it is instead determined during step 208 that a power reduction is required for a particular radio frequency/RAT, vehicle and jurisdiction combination, then a maximum power reduction (or back-off) value is determined and recorded accordingly during step 214. Specifically, in various embodiments, a processor (such as the processor 38 of FIG. 1) records a power reduction (or back-off) value representing a magnitude of power reduction (or back-off) that is required for the operation of the antenna 70 and telematics unit 24 to satisfy regulatory requirements for each specific radio frequency/RAT, vehicle and jurisdiction combination. In various embodiments, this value is recorded for each radio frequency/RAT, vehicle and jurisdiction in a computer memory (e.g., such as the memory 40 and/or the database 56 of FIG. 1).

In various embodiments, following step 214, the first subprocess 201 then terminates, and the process then proceeds to step 216 during the beginning of the second subprocess 216 (e.g., when the vehicle 12 is operated on a roadway), as described in greater detail below.

Accordingly, in various embodiments, the first sub-process 201 generates a table that is customizable for a particular vehicle type based on make, model, and year, and that covers any jurisdictions in which the vehicle may be operated. In various embodiments, the data recorded in steps 210-214 results in a table that includes maximum radio frequency conducted transmit power data, along with any required power reductions (i.e., back-offs) for each particular radio frequency/RAT at each different jurisdiction for the particular type of vehicle (i.e., make, model, and year).

Moreover, in various embodiments, the second sub-process 215 begins with step 216, when a vehicle is started and/or its modem is reset. In certain embodiments, this occurs when one or more users of the vehicle 12 (e.g., a driver or other occupant) approaches or enters the vehicle 12, or turns on the vehicle 12 and/or an ignition therefor (e.g. by turning a key, engaging a keyfob or start button, and so on), and/or when a vehicle drive begins or is initiated, as determined by the processor 28 using sensor data from one or more ignition sensors 73 of FIG. 1. Also in certain embodiments, step 216 begins when a modem of the vehicle 12 (such as wireless modem 36 of FIG. 1) is reset. In various embodiments, the process then proceeds to step 218, described below.

In various embodiments, during step 218, a determination is made as to whether an antenna is connected. In various embodiments, this determination is made by the processor 38 of FIG. 1 based on sensor data that is obtained by one or more antenna sensors 74 of FIG. 1 as to whether an antenna (such as the antenna 70 of FIG. 1) is connected to the telematics unit 24 of FIG. 1.

In various embodiments, if it is determined at step 218 that an antenna is not connected, then the process proceeds to step 220. During step 220, the default maximum power is provided for the radio frequency at which the telematics unit 24 and antenna 70 are operated, based upon instructions provided by the processor 38 of FIG. 1. Specifically, in various embodiments, power is provided in accordance with the default value that is typical for the particular radio frequency/RAT, for example that provides for optimal performance for the particular radio frequency/RAT, without any required reduction or back-off (e.g., per the discussion above with respect to steps 210 and 212). In certain embodiments, the process then ends at step 228.

Conversely, if it is instead determined at step 218 that an antenna is connected, then the process proceeds instead to step 222. During step 222, a determination is made as to whether a power reduction is required. In various embodiments, during step 222, the processor 38 of FIG. 1 determines whether current operation of the telematics unit 24 of FIG. 1 at its current frequency/RAT would emit radiated power that exceeds regulatory limits in a jurisdiction in which the vehicle 12 is operating. If the radiated power would exceed the regulatory limits, then a power reduction would be deemed to be required.

If it determined in step 222 that a power reduction is not required, then the process proceeds to the above-described step 220, in which the default maximum power is provided for the radio frequency/RAT at which the telematics unit 24 are operated, based upon instructions provided by the processor 38 of FIG. 1.

Conversely, if it is instead determined in step 222 that a power reduction is required, then the process proceeds instead to step 224. During step 224, geographic information is obtained. Specifically, in various embodiments, information is obtained via a satellite-based system (such as the GPS component 42 of FIG. 1) regarding a geographic location in which the vehicle 12 is operating. Also in various embodiments, a processor (such as the processor 38 of FIG. 1) identifies a jurisdiction (e.g., a governmental jurisdiction) corresponding to the geographic location in which the vehicle 12 is being operated. In various embodiments, the process then proceeds to step 226, described directly below.

During step 226, in various embodiments, the power is adjusted. Specifically, in various embodiments, during step 226 the power for a specific radio frequency/RAT being utilized by the antenna 70 and the telematics unit 24 is reduced (or backed off) in order to meet regulatory requirements for the particular jurisdiction in which the vehicle 12 is operating. In certain embodiments, the reduction (or back off) is made to a maximum power limit for the particular radio frequency/RAT, such that the radiated power emissions for that particular radio frequency/RAT do not exceed the maximum power limit. In various embodiments, this is performed in accordance with instructions provided by the processor 38 of FIG. 1.

In various embodiments, the process then terminates at step 228.

Accordingly, methods and system are provided for regulating power for antennas in vehicles, in order to meet regulatory radiated power emission requirements. In various embodiments, testing is performed during the design and manufacture of a vehicle type (e.g., make, model, and year of the vehicle), and a table of data is generated as to maximum power limit adjustments for each vehicle type with respect to different combinations of radio frequencies/RATs at which the telematics systems are operating and the jurisdiction in which the vehicle is operating.

In various embodiments, the disclosed methods and systems can help to meet regulatory radiated power emission requirements while also maintain functionality, as much as possible, for the cellular reception and functionality for the telematics systems. In addition, in various embodiments, the disclosed methods and systems can provide for real-time updates for example when a particular vehicle type (e.g., make, model, and year) has already completed or is nearly complete with production, or in situations in which the vehicle may travel among different jurisdictions and/or in which certain jurisdictions may change their radiated power emission requirements, and so on.

It will be appreciated that the systems and methods may vary from those depicted in the Figures and described herein. For example, the communications system of FIG. 1, including the vehicle thereof, the antenna, telematics unit, and control system thereof, and components thereof, may vary from that depicted in FIG. 1 and/or described herein, in various embodiments. It will similarly be appreciated that the process (and/or subprocesses) disclosed herein may differ from those described herein and/or depicted in FIG. 2, and/or that steps thereof may be performed simultaneously and/or in a different order as described herein and/or depicted in FIG. 2, among other possible variations While at least one example has been presented in the foregoing detailed description, it should be appreciated that a vast number of variations exist. It should also be appreciated that the example or examples are only examples, and are not intended to limit the scope, applicability, or configuration of the disclosure in any way. Rather, the foregoing detailed description will provide those skilled in the art with a convenient road map for implementing the example or examples. It should be understood that various changes can be made in the function and arrangement of elements without departing from the scope of the appended claims and the legal equivalents thereof

What is claimed is:

1. A method comprising:
   determining, via location sensor data, a geographic location in which the vehicle is being operated;
   determining, via the processor, a regulatory requirement for radiated power emissions for a jurisdiction associated with the geographic location;
   determining a current frequency of operation of an antenna of the vehicle;
   determining, via a processor of a telematics unit of a vehicle, whether power to the antenna of the vehicle would result in radiated power emissions that would exceed the regulatory requirement, based on the current frequency of the antenna and stored data regarding a magnitude of radiated power emissions associated with the current frequency in addition to the regulatory requirement radiated power emissions requirements of the jurisdiction in which the vehicle is currently located, the jurisdiction comprising one jurisdiction out of a plurality of jurisdictions through which the vehicle may travel and having different respective radiated power emissions requirements;
   providing power to the antenna in accordance with a default maximum power for the current frequency of operation, via instructions provided by the processor, when it is determined that the power to the antenna would not result in radiated power emissions that would exceed the regulatory requirement; and
   reducing power to the antenna, via instructions provided by the processor, when it is determined that the power to the antenna would result in radiated power emissions that would exceed the regulatory requirement.

2. The method of claim 1, further comprising:
   obtaining sensor data from one or more sensors as to whether the antenna is connected to a telematics unit of a vehicle;
   wherein the reducing of power to the antenna is performed only upon a further condition that the antenna is connected to the telematics unit, and wherein power to the antenna is provided in accordance with the default maximum power when the antenna is not connected.

3. The method of claim 1, further comprising:
   determining, via location sensor data obtained via a satellite-based location network, a geographic location in which the vehicle is being operated;
   wherein the step of determining whether power to the antenna would result in radiated power emissions that would exceed a regulatory requirement is based on regulatory requirements of a particular jurisdiction corresponding to the geographic location; and
   wherein the step of reducing power to the antenna is performed when it is determined that the power to the antenna would result in radiated power emissions that would exceed the regulatory requirements of the particular jurisdiction.

4. The method of claim 1, wherein the step of reducing power to the antenna comprises:
   reducing a maximum power limit to the antenna for a radio frequency or radio access technology (RAT) at which the telematics system is operating, when it is determined that the power to the antenna would result in radiated power emissions that would exceed the regulatory requirement.

5. The method of claim 4, wherein the step of reducing power to the antenna comprises:
   reducing the maximum power limit to the antenna only for the radio frequency or RAT at which the telematics system is operating, and not for other radio frequencies/RATs, when it is determined that the power to the antenna would result in radiated power emissions that would exceed the regulatory requirement.

6. The method of claim 4, wherein the maximum power limit to the antenna is reduced by a magnitude that is determined based on a table stored in a non-transitory computer memory as to power reductions required for a particular type of the vehicle for a plurality of different combinations of radio frequencies in which the telematics unit may be operating and jurisdictions in which the vehicle may travel.

7. The method of claim 6, wherein the table is generated based on testing in a laboratory using one or more vehicles of a same type as the vehicle with respective telematics units operating at a plurality of different radio frequencies/RATs, with antenna gain for the antenna measured at each of the plurality of frequencies/RATs.

8. A system comprising:
  a non-transitory computer readable storage medium storing a computer program configured to at least facilitate:
    determining, via location sensor data, a geographic location in which the vehicle is being operated;
    determining, via the processor, a regulatory requirement for radiated power emissions for a jurisdiction associated with the geographic location;
    determining a current frequency of operation of an antenna of the vehicle;
    determining, via a processor of a telematics unit of a vehicle, whether power to the antenna of the vehicle would result in radiated power emissions that would exceed the regulatory requirement, based on the current frequency of the antenna and stored data regarding a magnitude of radiated power emissions associated with the current frequency in addition to radiated power emissions requirements of the jurisdiction in which the vehicle is currently located, the jurisdiction comprising one jurisdiction out of a plurality of jurisdictions through which the vehicle may travel and having different respective radiated power emissions requirements;
    providing power to the antenna in accordance with a default maximum power for the current frequency of operation, via instructions provided by the processor, when it is determined that the power to the antenna would not result in radiated power emissions that would exceed the regulatory requirement; and
    reducing power to the antenna, via instructions provided by the processor, when it is determined that the power to the antenna would result in radiated power emissions that would exceed the regulatory requirement; and
  a processor coupled to the non-transitory computer readable storage medium and configured to execute the program.

9. The system of claim 8, wherein the program is further configured to at least facilitate:
  obtaining sensor data from one or more sensors as to whether the antenna is connected to a telematics unit of a vehicle; and
  performing the reducing of power to the antenna only upon a further condition that the antenna is connected to the telematics unit, and wherein power to the antenna is provided instead in accordance with the default maximum power when the antenna is not connected.

10. The system of claim 8, wherein the program is further configured to at least facilitate:
  determining, via location sensor data obtained via a satellite-based location network, a geographic location in which the vehicle is being operated;
  determining whether power to the antenna would result in radiated power emissions that would exceed a regulatory requirement based on regulatory requirements of a particular jurisdiction corresponding to the geographic location; and
reducing power to the antenna when it is determined that the power to the antenna would result in radiated power emissions that would exceed the regulatory requirements of the particular jurisdiction.

11. The system of claim 8, wherein the program is further configured to at least facilitate:
  reducing a maximum power limit to the antenna for a radio frequency or radio access technology (RAT) at which the telematics system is operating, when it is determined that the power to the antenna would result in radiated power emissions that would exceed the regulatory requirement.

12. The system of claim 11, wherein the program is further configured to at least facilitate:
  reducing the maximum power limit to the antenna by a magnitude that is determined based on a table stored in a non-transitory computer memory as to power reductions required for a particular type of the vehicle for a plurality of different combinations of radio frequencies/RATs in which the telematics unit may be operating and jurisdictions in which the vehicle may travel.

13. The system of claim 12, wherein the program is further configured to at least facilitate:
  generating the table based on testing in a laboratory using one or more vehicles of a same type as the vehicle with respective telematics units operating at a plurality of different radio frequencies/RATs, with antenna gain for the antenna measured at each of the plurality of frequencies/RATs.

14. A vehicle comprising:
  an antenna; and
  a telematics system configured to be coupled to the antenna, the telematics system comprising a processor that is configured to at least facilitate:
    determining, via location sensor data, a geographic location in which the vehicle is being operated;
    determining, via the processor, a regulatory requirement for radiated power emissions for a jurisdiction associated with the geographic location;
    determining a current frequency of operation of antenna of the vehicle;
    determining whether power to the antenna of the vehicle would result in radiated power emissions that would exceed the regulatory requirement, based on the current frequency of the antenna and stored data regarding a magnitude of radiated power emissions associated with the current frequency in addition to radiated power emissions requirements of the jurisdiction in which the vehicle is currently located, the jurisdiction comprising one jurisdiction out of a plurality of jurisdictions through which the vehicle may travel and having different respective radiated power emissions requirements;
    providing power to the antenna in accordance with a default maximum power for the current frequency of operation, via instructions provided by the processor, when it is determined that the power to the antenna would not result in radiated power emissions that would exceed the regulatory requirement; and reducing power to the antenna when it is determined that the power to the antenna would result in radiated power emissions that would exceed the regulatory requirement.

15. The vehicle of claim 14, further comprising:

one or more sensors configured to obtain sensor data as to whether the antenna is connected to a telematics unit of a vehicle;

wherein the processor is further configured to at least facilitate performing the reducing of power to the antenna only upon a further condition that the antenna is connected to the telematics unit, and wherein power to the antenna is provided instead in accordance with the default maximum power when the antenna is not connected.

16. The vehicle of claim 14, further comprising:

a satellite-based navigation component configured to obtain location sensor data as to a geographic location in which the vehicle is being operated;

wherein the processor is further configured to at least facilitate:

determining whether power to the antenna would result in radiated power emissions that would exceed a regulatory requirement based on regulatory requirements of a particular jurisdiction corresponding to the geographic location; and reducing power to the antenna when it is determined that the power to the antenna would result in radiated power emissions that would exceed the regulatory requirements of the particular jurisdiction.

17. The vehicle of claim 14, wherein the processor is further configured to at least facilitate:

reducing a maximum power limit to the antenna for a radio frequency or radio access technology (RAT) at which the telematics system is operating, when it is determined that the power to the antenna would result in radiated power emissions that would exceed the regulatory requirement.

18. The vehicle of claim 17, wherein the processor is further configured to at least facilitate:

reducing a maximum power limit to the antenna only for the radio frequency or RAT at which the telematics system is operating, and not for other radio frequencies, when it is determined that the power to the antenna would result in radiated power emissions that would exceed the regulatory requirement.

19. The vehicle of claim 17, wherein the processor is further configured to at least facilitate:

reducing the maximum power limit to the antenna by a magnitude that is determined based on a table stored in a non-transitory computer memory as to power reductions required for a particular type of the vehicle for a plurality of different combinations of radio frequencies/RATs in which the telematics unit may be operating and jurisdictions in which the vehicle may travel.

20. The vehicle of claim 19, wherein the processor is further configured to at least facilitate:

generating the table based on testing in a laboratory using one or more vehicles of a same type as the vehicle with respective telematics units operating at a plurality of different radio frequencies/RATs, with antenna gain for the antenna measured at each of the plurality of frequencies.

* * * * *